(12) United States Patent
Higo et al.

(10) Patent No.: US 8,219,734 B2
(45) Date of Patent: Jul. 10, 2012

(54) ELECTRONIC APPARATUS AND DATA CORRUPTION PREVENTION METHOD

(75) Inventors: Takuma Higo, Tokyo (JP); Takaharu Fujii, Saitama (JP); Ryuichiro Noto, Chiba (JP); Taichi Yoshio, Kanagawa (JP)

(73) Assignee: Sony Corporation, Tokyo (JP)

( * ) Notice: Subject to any disclaimer, the term of this patent is extended or adjusted under 35 U.S.C. 154(b) by 83 days.

(21) Appl. No.: 12/033,230

(22) Filed: Feb. 19, 2008

(65) Prior Publication Data
US 2008/0222334 A1    Sep. 11, 2008

(30) Foreign Application Priority Data
Mar. 7, 2007    (JP) ................................. 2007-057319

(51) Int. Cl.
*G06F 13/00* (2006.01)
(52) U.S. Cl. ........................................ 710/302; 710/304
(58) Field of Classification Search .................. 710/302, 710/304; 700/94; 381/86
See application file for complete search history.

(56) References Cited

U.S. PATENT DOCUMENTS

| | | | | |
|---|---|---|---|---|
| 5,510,957 A * | 4/1996 | Takagi | .......................... | 361/814 |
| 6,483,428 B1 * | 11/2002 | Fish et al. | ................... | 340/425.5 |
| 6,705,688 B2 * | 3/2004 | Tobishima | ................. | 312/223.1 |
| 6,708,283 B1 * | 3/2004 | Nelvin et al. | ...................... | 714/5 |
| 7,043,267 B1 * | 5/2006 | Saotome et al. | .............. | 455/557 |
| 7,146,437 B2 * | 12/2006 | Robbin et al. | .................. | 710/16 |
| 7,272,013 B1 * | 9/2007 | Sivertsen | ....................... | 361/752 |
| 7,817,589 B2 * | 10/2010 | Hoffmann et al. | ............ | 370/310 |
| 2003/0108046 A1 * | 6/2003 | Simeone | ..................... | 370/395.1 |
| 2004/0165734 A1 * | 8/2004 | Li | ..................... | 381/86 |
| 2005/0149260 A1 * | 7/2005 | Bae | ................ | 701/209 |
| 2005/0151422 A1 * | 7/2005 | Gilmour | ...................... | 307/10.1 |
| 2005/0154815 A1 * | 7/2005 | Molander et al. | .............. | 710/302 |
| 2005/0182612 A1 * | 8/2005 | Anderson et al. | ............... | 703/18 |
| 2006/0249990 A1 * | 11/2006 | Lee | ................ | 296/224 |
| 2007/0271476 A1 * | 11/2007 | Jang | .............................. | 713/324 |
| 2008/0027572 A1 * | 1/2008 | Romoser | ......................... | 700/94 |
| 2008/0158792 A1 * | 7/2008 | Itoh | ............................... | 361/679 |

FOREIGN PATENT DOCUMENTS

| | | |
|---|---|---|
| JP | 6-231055 | 8/1994 |
| JP | 10-11552 | 1/1998 |
| JP | 10-11553 | 1/1998 |
| JP | 3077518 U | 2/2001 |
| JP | 2006-53629 | 2/2006 |

OTHER PUBLICATIONS

Office Action issued May 24, 2011 in Japan Application No. 2007-057319.

* cited by examiner

*Primary Examiner* — Mark Rinehart
*Assistant Examiner* — Nimesh G Patel
(74) *Attorney, Agent, or Firm* — Oblon, Spivak, McClelland, Maier & Neustadt, L.L.P.

(57) ABSTRACT

An electronic apparatus includes a main body and a panel unit removable from the main body. The electronic apparatus also includes an attachment unit in the panel unit that indirectly attaches a removable memory device to the main body through the panel unit. The main body includes a control unit that logically disconnects a data line logically connecting the removable memory device to the main body through the attachment unit, upon an operation before a power line electrically connecting the removable memory device to the main body through the attachment unit is physically disconnected.

13 Claims, 6 Drawing Sheets

ELECTRONIC APPARATUS AND DATA CORRUPTION PREVENTION METHOD

CROSS REFERENCES TO RELATED APPLICATIONS

The present invention contains subject matter related to Japanese Patent Application JP 2007-057319 filed in the Japanese Patent Office on Mar. 7, 2007, the entire contents of which are incorporated herein by reference.

BACKGROUND OF THE INVENTION

1. Field of the Invention

The present invention relates to an electronic apparatus and a data corruption prevention method which are suitable for use in, for example, car audio systems mounted in vehicles.

2. Description of the Related Art

Existing car audio systems are configured to receive radio broadcasts or play back compact discs (CDs) according to users' operations when they are mounted in vehicles' dashboards to allow users to listen to sound output through speakers mounted in the vehicles.

Due to their compatibility with vehicles, such car audio systems are generally designed so as to comply with dimensions specified by the Deutsche Industrie Normen (DIN) standard, namely, a lateral width of 178 mm and a height of 50 mm (hereinafter referred to as "DIN dimensions").

Car audio systems with a large number of operation buttons or a large display screen on a front panel thereof defined by the DIN dimensions have been demanded for achieving various functions and improving visibility of a display unit.

Some proposed car audio systems are provided with a front panel that is openable and closable so that the front panel can be opened to allow insertion of a CD (with a diameter of about 120 mm and a thickness of about 1.2 mm) into a main body of the car audio systems (see, for example, Japanese Unexamined Patent Application Publication No. 2002-184164).

In such car audio systems, a conceivable method for electrically connecting the front panel and the main body is to provide a contact-type connection terminal for each of a rear face of the front panel and a front face of the main body. In car audio systems including such connection terminals, the connection terminals are physically separated when the front panel is opened, and the front panel and the main body becomes electrically disconnected.

SUMMARY OF THE INVENTION

Recently, media adapted to store various types of information, such as universal serial bus (USB) memory devices having non-volatile semiconductor memory devices accommodated in compact housings thereof and including USB connectors have been widely used.

The USB memory devices are powered from the outside through the USB connectors, and perform operations such as reading data requested by users.

Car audio systems provided with USB sockets have also been demanded to reproduce music data stored in the USB memory devices in an audio format such as MP3 (Motion Picture Expert Group-1 Layer-3).

In the car audio systems, for ease of use, the USB sockets are disposed in front panels of the car audio systems to make the USB memory devices easily removable. The USB memory devices perform a predetermined connection termination operation to protect data stored therein when they are removed from the front panels.

In the car audio systems, however, if the front panels are opened when USB memory devices are still connected to the USB sockets on the front panels, the front panels become electrically disconnected from main bodies of the car audio systems. This causes the car audio systems to suddenly disconnect power supply to the USB memory devices, resulting in a problem in that data in the USB memory devices may be corrupted.

It is therefore desirable to provide an electronic apparatus and a data corruption prevention method which ensure protection of data in a removable memory device against unexpected electrical disconnection.

According to an embodiment of the present invention, an electronic apparatus includes a main body, a panel unit removable from the main body, and an attachment unit configured to indirectly attach a removable memory device to the main body through the panel unit, wherein the main body includes control means for logically disconnecting a data line between the removable memory device and the main body at a time when a user operation for removing the panel unit from the main body is performed and before the panel unit is removed from the main body.

This allows the removable memory device and the main body to be logically separated before the panel unit is physically removed from the main body to disconnect power supply from the main body to the removable memory device. Thus, corruption of data stored in the removable memory device can be prevented.

According to another embodiment of the present invention, a data corruption prevention method includes the steps of detecting, in a state where a removable memory device is indirectly attached to a main body through a panel unit that is removable from the main body, performance of a user operation for removing the panel unit from the main body as a trigger event, and when the trigger event is detected, logically disconnecting a data line between the removable memory device and the main body before the panel unit is removed from the main body.

This allows the removable memory device and the main body to be logically separated before the panel unit is physically removed from the main body to disconnect power supply from the main body to the removable memory device. Thus, corruption of data stored in the removable memory device can be prevented.

According to some embodiments of the present invention, the removable memory device and the main body are logically separated before the panel unit is physically removed from the main body to disconnect power supply from the main body to the removable memory device, thereby preventing corruption of data stored in the removable memory device. Therefore, an electronic apparatus and a data corruption prevention method which ensure protection of data in a removable memory device against unexpected electrical disconnection can be achieved.

DESCRIPTION OF THE PREFERRED EMBODIMENTS

An embodiment of the present invention will be described in detail hereinafter with reference to the drawings.

Figure 1:
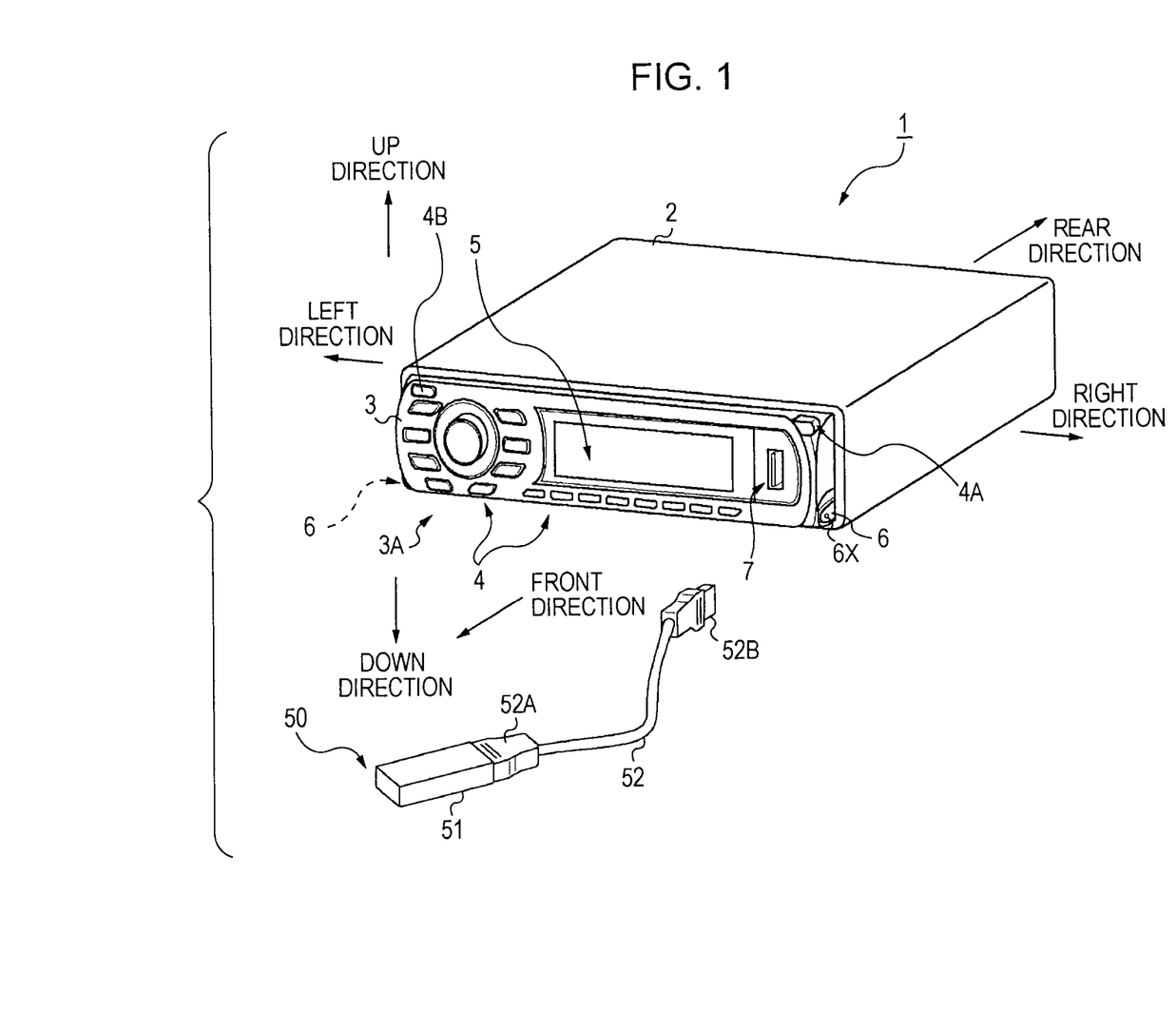
FIG. 1 is a schematic perspective view showing an external configuration of a car audio system according to an embodiment of the present invention.
Figure 2:
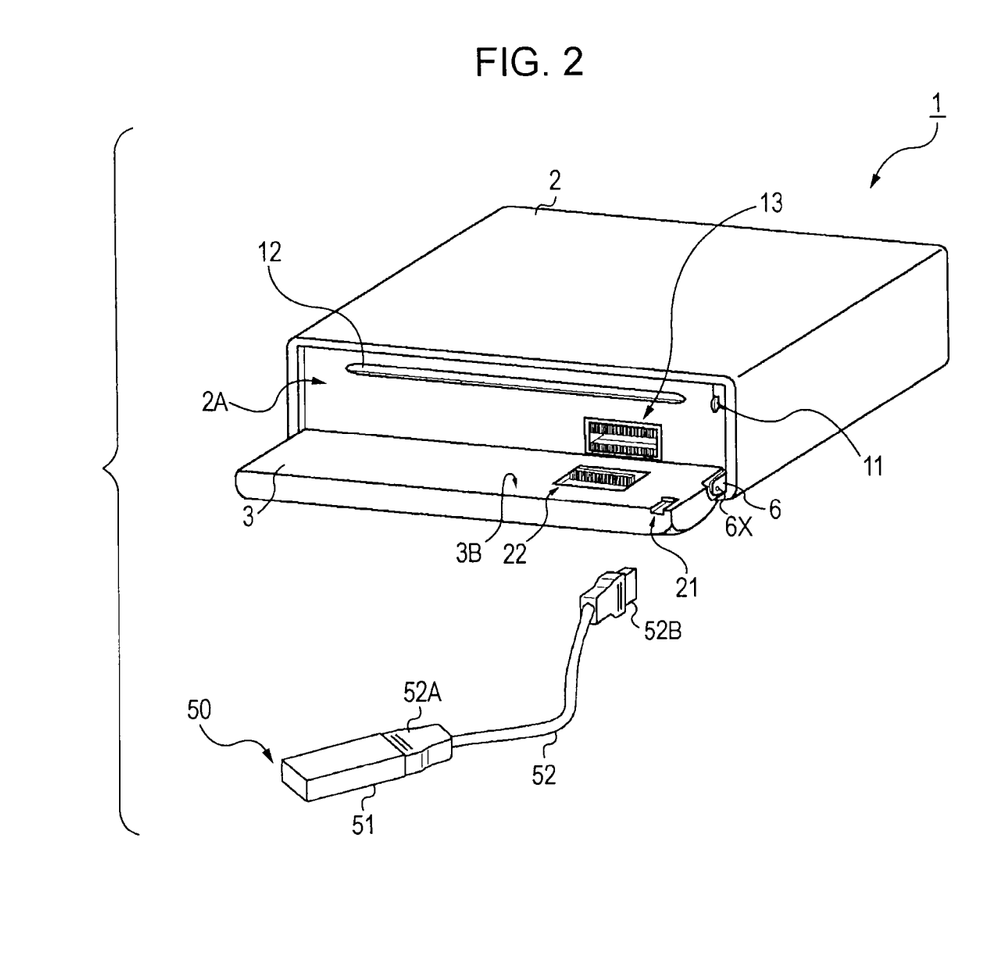
FIG. 2 is a schematic perspective view showing an external configuration of the car audio system.
Figure 3:
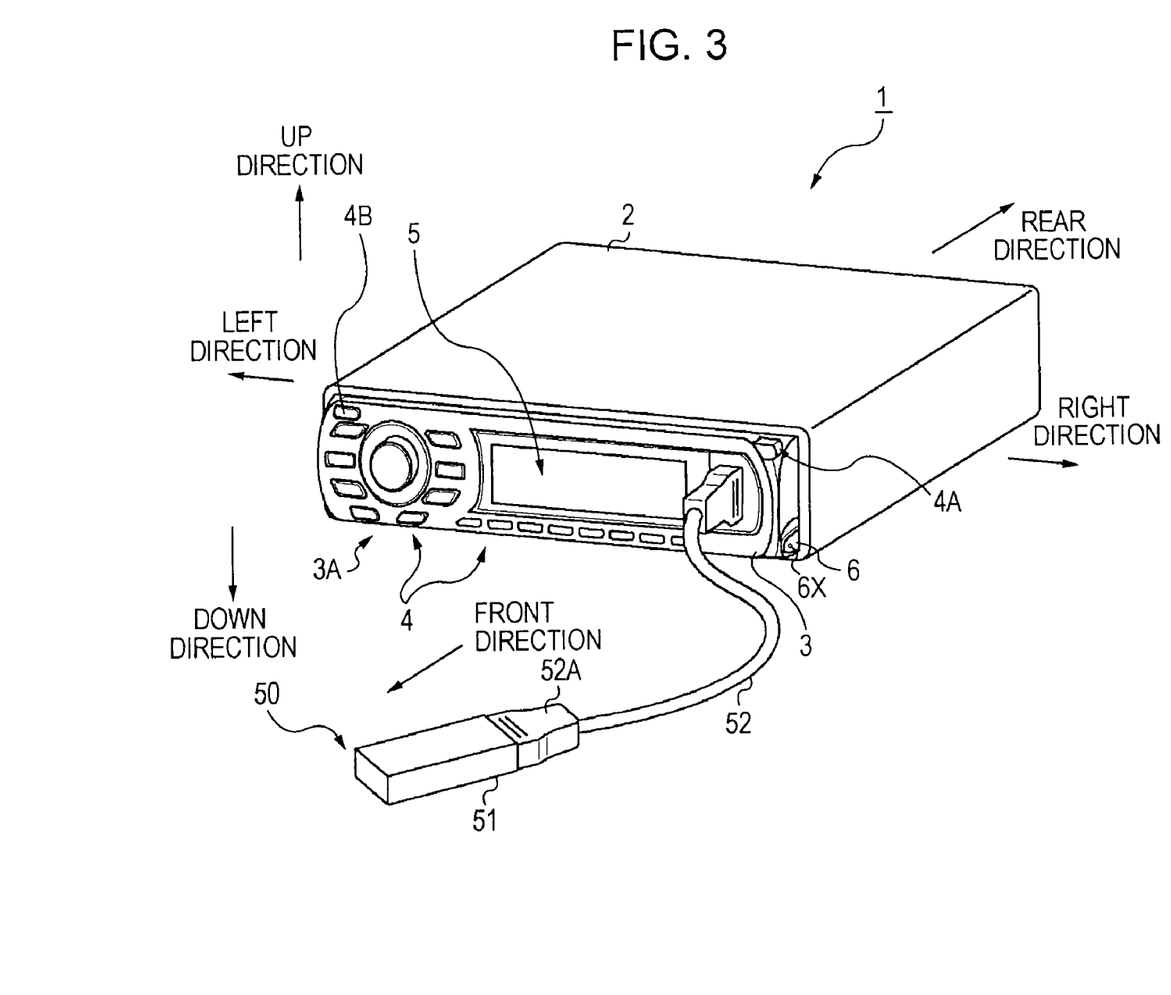
FIG. 3 is a schematic perspective view showing an external configuration of the car audio system.

As shown in FIGS. 1 to 3, a car audio system 1, which is an example of an electronic apparatus according to an embodiment of the present invention, includes a main body 2 having a front panel 3 on a front side thereof. The car audio system 1 is operable to receive a radio broadcast or play back a CD according to a user's operation to allow a user to listen to sound through speakers (not shown) connected to the main body 2.

The car audio system 1 is mounted in a vehicle (not shown). Due to the spatial constraints and the like of the vehicle, the car audio system 1 is mounted so that a major portion of the main body 2 is embedded in a vehicle dashboard and only the front panel 3 is exposed to the outside of the vehicle dashboard.

In effect, the car audio system 1 is compliant with the DIN dimensions. That is, the main body 2 and the front panel 3 are configured so as to meet a lateral width of about 178 mm and a height of 50 mm.

The front panel 3 (see FIG. 1) includes on a front face 3A thereof an operation button group 4 and a display unit 5 such as a liquid crystal display. The operation button group 4 is operable to receive an operation input from a user, and the display unit 5 is operable to present various types of information to the user. The front panel 3 thus functions as a user interface.

The front panel 3 is rotatably supported by a rotating shaft 6X of front panel support plates 6. The front panel support plates 6 are mounted in lower right and left portions of the front panel 3 so as to project frontward from the main body 2. As shown in FIG. 2, a lock hook 11 operable to lock the front panel 3 in closed condition is provided on front face 2A of the main body 2, and a lock hook receiver 21 is provided correspondingly on a rear face 3B of the front panel 3 so as to be engaged with the lock hook 11.

The lock hook 11 of the main body 2 is engaged and locked with the lock hook receiver 21 of the front panel 3 to thereby hold the front panel 3 in the closed condition shown in FIG. 1 where the rear face 3B of the front panel 3 faces the front face 2A of the main body 2, that is, in condition where the front face 3A of the front panel 3 is directed to the front side of the car audio system 1 (hereinafter referred to as a "closed condition").

The front panel 3 further includes an open button 4A on an upper right portion thereof (see FIGS. 1 and 3). When the user presses the open button 4A, the locked state between the lock hook 11 of the main body 2 and the lock hook receiver 21 of the front panel 3 is released and the front panel 3 is rotated in the front-down direction about the rotating shaft 6X of the front panel support plates 6. As a consequence, as shown in FIG. 2, the front panel 3 is changed to a state where the front face 3A is directed downward while the rear face 3B is directed upward (hereinafter referred to as an "open condition").

The front panel 3 further includes a detach button 4B on an upper left portion thereof. When the user presses the detach button 4B, the locked state between the lock hook 11 of the main body 2 and the lock hook receiver 21 of the front panel 3 is released and the attached state between the front panel support plates 6 and the lower portions of the front panel 3 is also released so that the front panel 3 itself can be completely removed from the main body 2.

On the front face 2A of the main body 2, a disk insertion slot 12 is further provided into or from which a CD medium (with a diameter of about 120 mm and a thickness of about 1.2 mm) is inserted or ejected. In the car audio system 1, the disk insertion slot 12 provided on the front face 2A of the main body 2 allows improvement in design flexibility such as the number and arrangement of operation buttons 4 on the front panel 3 or the size of the display unit 5.

On the front face 2A of the main body 2, a connector 13 is further provided through which an electrical signal is exchanged with the front panel 3. On the rear face 3B of the front panel 3, a connector 22 is provided correspondingly at a position corresponding to that of the connector 13.

The connectors 13 and 22 are brought into contact with each other in the closed condition shown in FIG. 1. In the closed condition, the main body 2 and the front panel 3 are electrically connected. In the open condition shown in FIG. 2, on the other hand, the connectors 13 and 22 are physically separated and the front panel 3 is electrically disconnected from the main body 2.

The car audio system 1 is also configured such that the front panel 3 is completely separated and removed from the main body 2, for example, during parking of the vehicle for anti-theft purposes. Thus, the main body 2 and the front panel 3 are electrically connectable or separable through the connectors 13 and 22.

In the car audio system 1, therefore, when the main body 2 and the front panel 3 are being electrically connected, a signal indicating that the open button 4A or the detach button 4B on the front panel 3 has been pressed is transmitted to the main body 2.

The front panel 3 further includes a USB socket 7 compliant with the USB standard right adjacent to the display unit 5 on the front face 3A. The USB socket 7 is used in a case where a USB memory device 50 compliant with the USB standard is connected through a USB cable 52 or in a case where the USB memory device 50 is connected directly.

The USB memory device 50 is configured such that a non-volatile memory device and a USB interface function are provided in a USB memory main body 51, and is provided with a USB plug compliant with the USB standard in which two power lines (VBUS and GND) and two data lines (D+ and D−) are used. The USB plug is connected to a jack 52A of the USB cable 52, and another jack 52B of the USB cable 52 is connected to the USB socket 7.

As shown in FIG. 3, in the closed condition of the front panel 3, the USB memory device 50 is USB-connected to, for example, the main body 2 of the car audio system 1 that serves as a USB host device through the USB cable 52. In this state, the USB memory device 50 reads data etc., from the non-volatile memory device according to a request from the car audio system 1, and transmits the read data etc., to the car audio system 1.

Accordingly, the car audio system 1 is configured to receive a radio broadcast or play back a CD by the main body 2 and also to read data stored in the externally connected USB memory device 50, such as audio data, to output music corresponding to the audio data.

In the car audio system 1, in some cases, a user may insert a CD into the disk insertion slot 12 during the reading of audio data from the USB memory device 50 and the output of music through the speakers by the main body 2. In other cases, a user may accidentally press the open button 4A on the front panel 3 to eject a CD so that the front panel 3 is brought into the open condition with respect to the main body 2, or may press the detach button 4B so that the front panel 3 is removed from the main body 2.

In such cases, power supply from the main body 2 to the USB memory device 50 through the connector 13 of the main body 2, the connector 22 of the front panel 3, and the USB socket 7 is disconnected and audio data currently being read from the USB memory device 50 may be corrupted. The car audio system 1 of the embodiment of the present invention is designed to avoid such a problem, which will be described with respect to the circuit structure of the car audio system 1.

The circuit structure of the main body 2 and front panel 3 of the car audio system 1 will be described. In the following description, not all but a part of the circuit structure that relates to an arrangement operable to prevent corruption of data in the USB memory device 50 will be mainly described.

Figure 4:
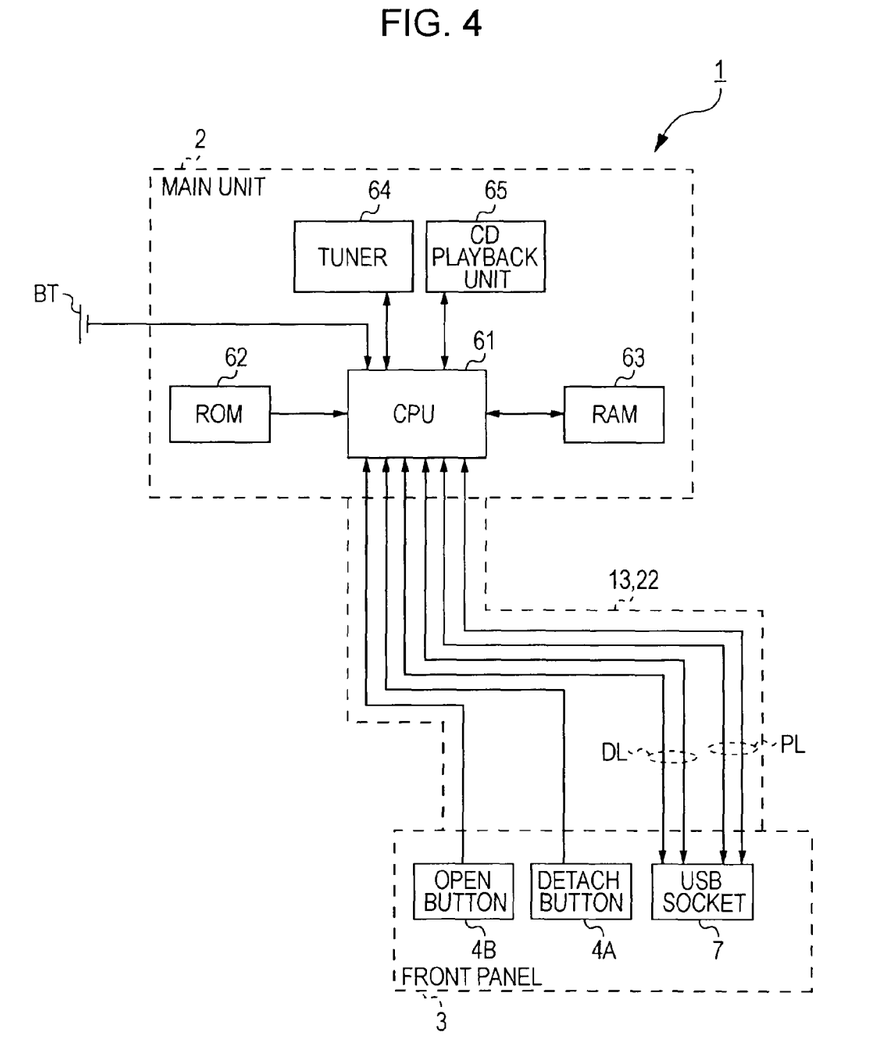
FIG. 4 is a schematic block diagram showing a circuit structure of the car audio system.

As shown in FIG. 4, the main body 2 of the car audio system 1 is powered from a battery BT of the vehicle. In the main body 2, a central processing unit (CPU) 61 reads a basic program and various application programs from a read only memory (ROM) 62 and loads them in a random access memory (RAM) 63 to control operations such as receiving and outputting a radio broadcast by a tuner 64, playing back a CD by a CD playback unit 65, and reproducing and outputting music data read from the USB memory device 50 USB-connected through the front panel 3 according to the basic program and various application programs.

In the car audio system 1, in the closed condition of the front panel 3, the connector 13 of the main body 2 and the connector 22 of the front panel 3 are electrically connected. When the front panel 3 and the USB memory device 50 are connected through the USB socket 7 and the USB cable 52, a connection between the connectors 13 and 22 allows power supply from the main body 2 to the USB memory device 50 through the USB socket 7 of the front panel 3 and the USB cable 52 using two power-supply power lines PL, and allows transfer of music data read from the USB memory device 50 to the CPU 61 of the main body 2 using two data-exchange data lines DL.

In the car audio system 1, when the user presses the open button 4A or detach button 4B on the front panel 3, a signal indicating the depression of the open button 4A or the detach button 4B is sent to the CPU 61 of the main body 2 through the connectors 22 and 13.

Thus, the CPU 61 of the main body 2 recognizes that the open button 4A or detach button 4B on the front panel 3 has been pressed by the user, and executes a data corruption prevention procedure of the USB memory device 50 described below.

The car audio system 1 has two procedures for preventing corruption of data in the USB memory device 50, that is, a procedure for preventing corruption of data in the USB memory device 50 based on disconnection of data lines and a procedure for preventing corruption of data in the USB memory device 50 based on transition to a standby mode. The two procedures will be described in this order.

First, the procedure for preventing corruption of data in the USB memory device 50 based on disconnection of data lines will be described.

Figure 5:
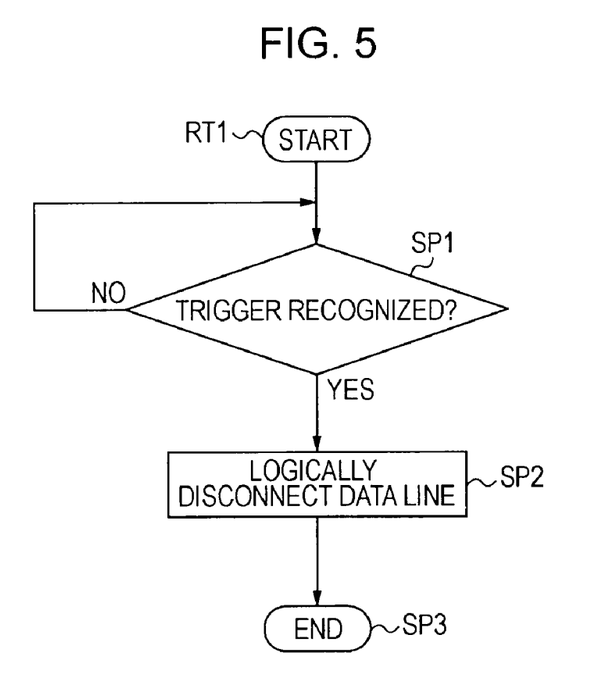
FIG. 5 is a flowchart showing a procedure for preventing corruption of data in a USB memory device based on disconnection of data lines.

As shown in FIG. 5, the CPU 61 of the main body 2 starts a routine RT1, and proceeds to step SP1. In step SP1, the CPU 61 determines whether or not it is recognized as a trigger event that the open button 4A or detach button 4B on the front panel 3 has been pressed by the user.

If a negative result is obtained in step SP1, this means that the user has not pressed either the open button 4A or detach button 4B on the front panel 3, or that the user does not desire to bring the front panel 3 into the open condition with respect to the main body 2 or to remove the front panel 3 from the main body 2. In this case, the CPU 61 waits from a trigger event to be recognized.

If a positive result is obtained in step SP1, on the other hand, this means that the user has pressed the open button 4A or detach button 4B on the front panel 3, or that the user intends to bring the front panel 3 into the open condition with respect to the main body 2 or to remove the front panel 3 from the main body 2. In this case, the CPU 61 proceeds to step SP2.

In step SP2, since the CPU 61 of the main body 2 has detected a trigger event caused by pressing the open button 4A or detach button 4B on the front panel 3 by the user, before the power lines PL are disconnected and power supply from the main body 2 to the USB memory device 50 is disconnected as a result of bring the front panel 3 into the open condition with respect to the main body 2 or removing the front panel 3 from the main body 2, the two data lines DL for data exchange are logically disconnected although they are still connected physically. This obviates corruption of the data stored in the USB memory device 50. Then, the CPU 61 proceeds to step SP3, and ends the process.

Next, the procedure for preventing corruption of data in the USB memory device 50 based on transition to a standby mode will be described.

Figure 6:
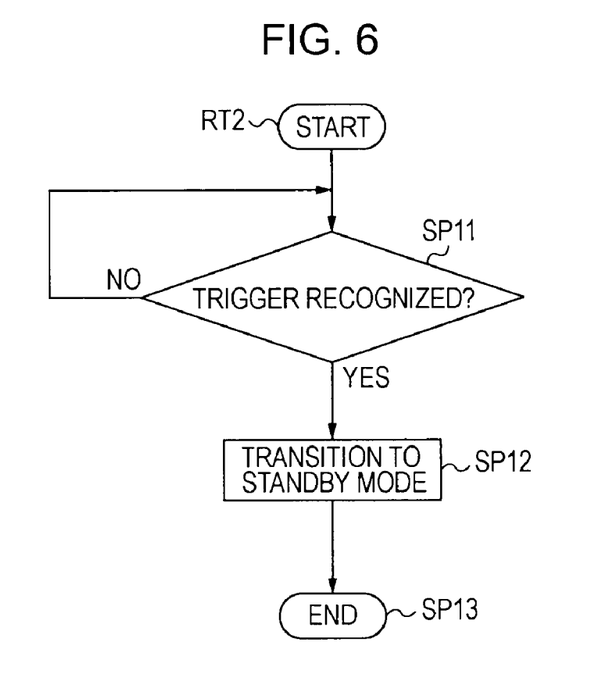
FIG. 6 is a flowchart showing a procedure for preventing corruption of data in a USB memory device based on transition to a standby mode.

As shown in FIG. 6, the CPU 61 of the main body 2 starts a routine RT2, and proceeds to step SP11. In step SP11, the CPU 61 determines whether or not it is recognized as a trigger event that the open button 4A or detach button 4B on the front panel 3 has been pressed by the user.

If a negative result is obtained in step SP11, this means that the user has not pressed the open button 4A or detach button 4B on the front panel 3, or that the user does not desire to bring the front panel 3 into the open condition with respect to the main body 2 or to remove the front panel 3 from the main body 2. In this case, the CPU 61 waits for a trigger event to be recognized.

If a positive result is obtained in step SP11, on the other hand, this means that the user has pressed the open button 4A or detach button 4B on the front panel 3, or that the user intends to bring the front panel 3 into the open condition with respect to the main body 2 or to remove the front panel 3 from the main body 2. In this case, the CPU 61 proceeds to step SP12.

In step SP12, since the CPU 61 of the main body 2 has detected a trigger event caused by pressing the open button 4A or detach button 4B on the front panel 3 by the user, before the power lines PL are disconnected and power supply from the main body 2 to the USB memory device 50 is disconnected as a result of bringing the front panel 3 into the open condition with respect to the main body 2 or removing the front panel 3 from the main body 2, the CPU 61 itself is caused to enter a standby mode to stop data exchange between the CPU 61 and the USB memory device 50. This obviates corruption of the data stored in the USB memory device 50. Then, the CPU 61 proceeds to step SP13, and ends the process.

In the above configuration, if the open button 4A used for bringing the front panel 3 into the open condition or the detach button 4B used to removing the front panel 3 from the main body 2 is pressed when the CPU 61 of the main body 2 is reading and reproducing music data from the USB memory device 50 in the closed condition of the main body 2 and front panel 3 of the car audio system 1 and in the condition where the USB memory device 50 is attached to the USB socket 7 of the front panel 3 through the USB cable 52, the CPU 61 of the main body 2 recognizes the depression of the open button 4A or detach button 4B as a trigger event.

Since the CPU 61 of the main body 2 has recognized the depression of the open button 4A or detach button 4B as a trigger event, the data lines DL are logically disconnected although they are still connected to stop data exchange between the CPU 61 and the USB memory device 50 before the front panel 3 is brought into the open condition or before the front panel 3 is removed from the main body 2, that is, before the power lines PL between the main body 2 and the USB memory device 50 are disconnected to disconnect power supply from the main body 2 to the USB memory device 50. This can obviate corruption of the data stored in the USB memory device 50.

Likewise, since the CPU 61 of the main body 2 has recognized the depression of the open button 4A or detach button 4B as a trigger event, the CPU 61 itself is caused to enter the standby mode to stop data exchange between the CPU 61 and the USB memory device 50 before the front panel 3 is brought into the open condition or before the front panel 3 is removed from the main body 2, that is, before the power lines PL between the main body 2 and the front panel 3 are disconnected to disconnect power supply from the main body 2 to the USB memory device 50. This can obviate corruption of the data stored in the USB memory device 50.

When the CPU 61 of the main body 2 recognizes the depression of the open button 4A as a trigger event, this means that the front panel 3 temporarily transitions to the open condition with respect to the main body 2 and would possibly return to the closed condition. Thus, power supply is not logically stopped although the power lines PL are physically disconnected.

Thus, the car audio system 1 can restart power supply from the main body 2 to the front panel 3 immediately when the front panel 3 returns from the open condition to the closed condition, and can read audio data from the USB memory device 50 to reproduce and output music.

With the above configuration, in the car audio system 1, data exchange between the CPU 61 and the USB memory device 50 is electrically stopped at a time when the CPU 61 of the main body 2 recognizes user's depression of the open button 4A or detach button 4B on the front panel 3 as a trigger event and before power supply from the main body 2 to the USB memory device 50 is disconnected. This can securely prevent corruption of data stored in the USB memory device 50 without increasing the complexity of the configuration.

Other Embodiments

In the foregoing embodiment, when user's depression of the open button 4A or detach button 4B on the front panel 3 is recognized as a trigger event, the prevention procedure (see FIG. 5) for preventing corruption of data in the USB memory device 50 based on disconnection of data lines indicated by the routine RT1 is performed to prevent corruption of data in the USB memory device 50. In some embodiments of the present invention, a function for providing a predetermined warning display when the front panel 3 is brought into the open condition or is removed from the main body 2 before user's depression of the open button 4A or detach button 4B on the front panel 3 is recognized as a trigger event may be added.

Figure 7:
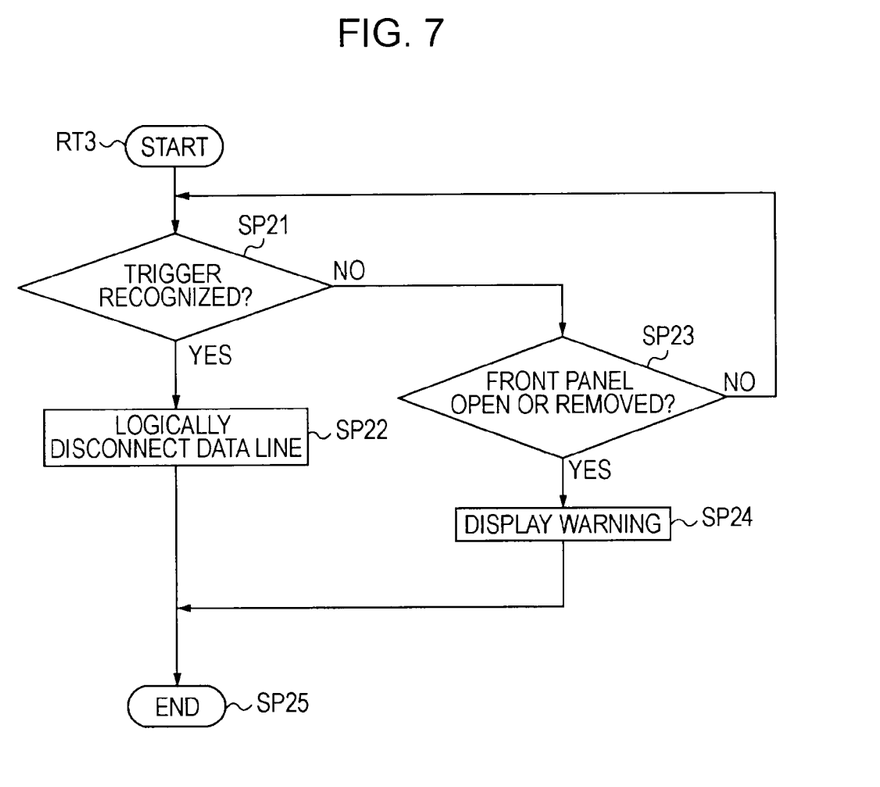
FIG. 7 is a flowchart showing a procedure for preventing corruption of data in a USB memory device based on disconnection of data lines according to another embodiment of the present invention.

Specifically, as shown in FIG. 7, the CPU 61 of the main body 2 starts a routine RT3, and proceeds to step SP21. In step SP21, the CPU 61 determines whether or not it is recognized as a trigger event that the open button 4A or detach button 4B on the front panel 3 has been pressed by the user.

If a positive result is obtained in step SP21, this means that the user has pressed the open button 4A or detach button 4B on the front panel 3, or that the user desires to bring the front panel 3 into the open condition with respect to the main body 2 or to remove the front panel 3 from the main body 2. In this case, the CPU 61 proceeds to step SP22.

In step SP22, since the CPU 61 of the main body 2 has detected a trigger event caused by pressing the open button 4A or detach button 4B on the front panel 3 by the user, before the power lines PL are disconnected and power supply from the main body 2 to the USB memory device 50 is disconnected as a result of bringing the front panel 3 into the open condition with respect to the main body 2 or removing the front panel 3 from the main body 2, the data lines DL are logically disconnected although they are still connected physically. This obviates corruption of the data stored in the USB memory device 50. Then, the CPU 61 proceeds to step SP25, and ends the process.

In step SP22, the CPU 61 of the main body 2 logically disconnects the two data lines DL although they are still connected physically, by way of example. However, as in step SP12 shown in FIG. 6, the CPU 61 itself may be caused to enter the standby mode to stop data exchange between the CPU 61 and the USB memory device 50 to thereby obviate corruption of the data stored in the USB memory device 50.

If a negative result is obtained in step SP21, on the other hand, this means that the user has not pressed the open button 4A or detach button 4B on the front panel 3. In this case, the CPU 61 proceeds to step SP23.

In step SP23, the CPU 61 of the main body 2 determines whether or not the front panel 3 is brought into the open condition or is removed from the main body 2 although the user has not pressed the open button 4A or detach button 4B on the front panel 3 by determining whether or not data exchange with the USB memory device 50 is allowed.

If a negative result is obtained in step SP23, this means that the front panel 3 is still in the closed condition and is not removed from the main body 2. In this case, the CPU 61 returns to step SP21, and repeats the above-described processing.

If a positive result is obtained in step SP23, on the other hand, this means that the front panel 3 is brought into the open condition or is removed from the main body 2 although the user has not pressed the open button 4A or detach button 4B on the front panel 3. In this case, the CPU 61 of the main body 2 proceeds to step SP24.

In step SP24, power supply from the main body 2 to the USB memory device 50 may possibly be disconnected to cause corruption of the data in the USB memory device 50. Therefore, the CPU 61 of the main body 2 reads a warning from the ROM 62 and displays it on the display unit 5 to prohibit the user from performing such an operation in the subsequent process. Examples of the warning include a warning message such as "Be sure to press the open button or detach button!" and a caution message such as "If you bring the front panel into the open condition or remove the front panel from the main body without pressing the open button or detach button, data in the USB memory device will be corrupted". Then, the CPU 61 proceeds to step SP25, and ends the process.

In the foregoing embodiment, a removable memory device has been described in the context of the USB memory device 50. The USB memory device 50 is merely an example, and any other external storage medium such as a flash memory or a removable hard disk may be used as the removable memory device.

In the foregoing embodiment, furthermore, power supply from the main body 2 is not logically stopped although the power lines PL are physically disconnected when the front panel 3 is brought into the open condition or when the front panel 3 is removed from the main body 2. In some embodiments of the present invention, the power lines PL may be logically disconnected to stop power supply at the same time as when the data lines DL are logically disconnected.

In the foregoing embodiment, moreover, the car audio system 1 serving as an electronic apparatus according to an embodiment of the present invention includes the main body 2 serving as a main body, the front panel 3 serving as a panel unit, the USB socket 7 serving as an attachment unit, and the CPU 61 serving as a control unit provided in the main body. In some embodiments of the present invention, an electronic apparatus may include any other main body, a control unit provided in the main body, a panel unit, and an attachment unit.

An electronic apparatus according to an embodiment of the present invention may be applied not only to the car audio system 1 but also to, for example, an in-house audio system configured such that a front panel is removable from a main body.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
   a main body including a first contact-type connection terminal;
   a panel unit removable from the main body,
   the panel unit including
      a second contact-type connection terminal that electrically connects to the first contact-type connection terminal, and
      receiving means for receiving an operation; and
   an attachment unit in the panel unit and configured to indirectly attach a removable memory device to the main body through the panel unit,
   the main body including control means for logically disconnecting a data line logically connecting the removable memory device to the main body through the attachment unit, upon the operation on the means for receiving and before a power line electrically connecting the removable memory device to the main body through the attachment unit is physically disconnected, wherein
   the control means determines whether the receiving means has received the operation,
   if the control means determines that the receiving means has not received the operation, the control means determines whether the panel unit has been at least one of (a) brought into an open condition and (b) removed from the main body, by determining whether a data exchange with the removable memory device is allowed, and,
   if the control means determines that the panel unit has been the at least one of (a) brought into the open condition and (b) removed from the main body, the control means produces a warning.

2. The electronic apparatus according to claim 1, wherein the control means logically disconnects the data line between the removable memory device and the main body before the panel unit is removed from the main body.

3. The electronic apparatus according to claim 1, wherein, when the panel unit is opened with respect to the main body to thereby temporarily remove the panel unit from the main body, the control means has logically disconnected the data line.

4. The electronic apparatus according to claim 1, wherein the panel unit further includes a display that displays the warning.

5. A data corruption prevention method, comprising:
   detecting, in a state where a removable memory device is indirectly attached to a main body through a panel unit that is removable from the main body, a performance of an operation on a button on the panel unit to release the panel unit from the main body as a trigger event, the main body including a first contact-type connection terminal, the panel unit including a second contact-type connection terminal that electrically connects to the first contact-type connection terminal;
   when the performance of the operation on the button on the panel unit to release the panel unit from the main body is detected as the trigger event, logically disconnecting a data line logically connecting the removable memory device to the main body through the panel unit before a power line electrically connecting the removable memory device to the main body through the panel unit is physically disconnected;
   determining, with a processor unit, whether the panel unit has been at least one of (a) brought into an open condition and (b) removed from the main body, by determining whether a data exchange with the removable memory device is allowed, when the performance of the operation on the button on the panel unit to release the panel unit from the main body is not detected as the trigger event, and
   producing a warning, if the determining determines that the panel unit has been the at least one of (a) brought into the open condition and (b) removed from the main body.

6. The data corruption prevention method according to claim 5, wherein, when the trigger event is detected, the data line between the removable memory device and the main body is logically disconnected before the panel unit is removed from the main body.

7. The data corruption prevention method according to claim 5, wherein, when the panel unit is opened with respect to the main body to thereby temporarily remove the panel unit from the main body, the data line has been logically disconnected.

8. An electronic apparatus, comprising:
   a main body including a first contact-type connection terminal;
   a panel unit removable from the main body,
   the panel unit including
      a second contact-type connection terminal that electrically connects to the first contact-type connection terminal, and
      a button to release the panel unit from the main body; and an attachment unit in the panel unit and configured to indirectly attach a removable memory device to the main body through the panel unit, the main body including a control unit configured to logically disconnect a data line logically connecting the removable memory device to the main body through the attachment unit, upon an operation on the button to release the panel unit from the main body and before a power line electrically connecting the removable memory device to the main body through the attachment unit is physically disconnected, wherein the control unit determines whether the button has received the operation, if the control unit determines that the button has not received the operation, the control unit determines whether the panel unit has been at least one of (a) brought into an open condition and (b) removed from the main body, by determining whether a data exchange with the removable memory device is allowed, and, if the control unit determines that the panel unit has been the at least one of (a) brought into the open condition and (b) removed from the main body, the control unit produces a warning.

9. The electronic apparatus according to claim 8, wherein the operation opens the panel unit for an insertion of a compact disc into, or an ejection of a compact disc from, the main body.

10. The electronic apparatus according to claim 8, wherein the control unit disconnects the data line by entering a standby mode.

11. The electronic apparatus according to claim 8, wherein the main body is embedded in a vehicle dashboard.

12. The electronic apparatus according to claim 8, wherein the panel unit rotates about a rotating shaft of at least one support plate, the panel unit locks to the main body in a closed condition, and the operation releases the panel unit from the closed condition.

13. The electronic apparatus according to claim 12, wherein the operation releases an attachment of the at least one support plate.

* * * * *